US 8,096,909 B2

(12) United States Patent
Kim et al.

(10) Patent No.: US 8,096,909 B2
(45) Date of Patent: Jan. 17, 2012

(54) POWER TRAIN OF HYBRID VEHICLE

(75) Inventors: Talchol Kim, Incheon (KR); Jongsool Park, Gyeonggi-do (KR); Byungsoon Min, Gyeonggi-do (KR); Changwook Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 232 days.

(21) Appl. No.: 12/274,683

(22) Filed: Nov. 20, 2008

(65) Prior Publication Data

US 2009/0312128 A1    Dec. 17, 2009

(30) Foreign Application Priority Data

Jun. 12, 2008  (KR) .................. 10-2008-0055114

(51) Int. Cl.
*F16H 3/72* (2006.01)
*F16H 37/06* (2006.01)

(52) U.S. Cl. ............. 475/5; 475/275; 475/317; 475/330

(58) Field of Classification Search .............. 475/5, 275, 475/317, 330; 180/65.225, 65.23, 65.6, 65.7; 477/3
See application file for complete search history.

(56) References Cited

U.S. PATENT DOCUMENTS

| 7,347,798 B2 * | 3/2008 | Raghavan et al. ............ 475/5 |
| 7,396,305 B2 * | 7/2008 | Raghavan et al. ............ 475/5 |
| 7,473,201 B2 * | 1/2009 | Raghavan et al. ............ 475/5 |
| 2007/0129202 A1 * | 6/2007 | Raghavan et al. ............ 475/275 |
| 2007/0129204 A1 * | 6/2007 | Bucknor et al. ............ 475/275 |

FOREIGN PATENT DOCUMENTS

| JP | 2006-288122 | 10/2006 |
| JP | 2006-326739 | 12/2006 |
| JP | 2006-341647 | 12/2006 |
| JP | 2006-347268 | 12/2006 |
| JP | 2008-120138 A | 5/2008 |
| JP | 2008-207657 A | 9/2008 |

* cited by examiner

*Primary Examiner* — Justin Holmes
*Assistant Examiner* — Huan Le
(74) *Attorney, Agent, or Firm* — Edwards Wildman Palmer LLP; Peter F. Corless; Steven D. LeBarron

(57) ABSTRACT

A power train according to an embodiment of the invention includes three sets of planetary gear sets, one clutch, and two brakes, such that it provides two electric vehicle modes, two hybrid modes, and two engine modes of overdrive shift ratio. Further, the power train of a hybrid vehicle has a simple configuration, high power performance, and reduced weight and fuel consumption, while being easily equipped in the vehicle. In particular, since an engine mode that makes it possible to reduce a significant amount of fuel consumption especially when a vehicle is traveling at a constant high-velocity.

5 Claims, 7 Drawing Sheets

POWER TRAIN OF HYBRID VEHICLE

CROSS-REFERENCE TO RELATED APPLICATIONS

The present application is based on, and claims priority from, Korean Application Serial Number 10-2008-0055114, filed on Jun. 12, 2008, the disclosure of which is hereby incorporated by reference herein in its entirety.

TECHNICAL FIELD

The present invention relates to a power train of a hybrid vehicle, particularly a power train of a hybrid vehicle that uses an internal combustion engine and a motor generator driven by electricity as a power source providing a driving force to driving wheels.

BACKGROUND ART

Hybrid vehicles using an engine and a motor generator reduce the fuel consumption on the basis of a technology that uses, as a driving force, power from a motor generator having relatively good low-velocity torque characteristics at a low velocity and uses power from an engine having relatively good high-velocity torque characteristics at a high velocity. Further, as the hybrid vehicles do not generate exhaust gas while being driven by only the motor generator, it is environment-friendly. Techniques for reducing fuel consumption with a simpler configuration have been proposed.

The above information disclosed in this Background ART section is only for enhancement of understanding of the background of the invention and therefore it may contain information that does not form the prior art that is already known in this country to a person of ordinary skill in the art.

SUMMARY

Embodiments of the present invention provide a power train of a hybrid vehicle having simple configuration, high power performance, and reduced weight and fuel consumption, while being easily equipped in the vehicle.

A power train of a hybrid vehicle according to the invention includes a first planetary gear set, a second planetary gear set, a third planetary gear set, a first brake, a second brake, and a clutch. The first planetary gear set includes three elements where an engine, a first motor generator, and an output shaft are separately connected. The second planetary gear set includes three elements, one element of which is directly connected with the element of the first planetary gear set connected with the output shaft and another element of which can be intermittently connected with and disengaged from the first motor generator. The third planetary gear set includes three elements, two elements of which are connected with the second planetary gear set and the other element of which is connected with a second motor generator. The first brake is provided to fix an element or elements of the second planetary gear set and the third planetary gear set, which are connected with the output shaft through at least one of the three planetary gear sets and fix an element or elements of the second planetary gear set and the third planetary gear set other than an element or elements connected at least intermittently with the first motor generator or the second motor generator. The clutch intermittently engages with the first motor generator an element of the second planetary gear set other than the element connected with the output shaft and the element connected with the first brake. The second brake is provided to fix the of the second planetary gear set connected with the clutch.

Preferably, the output shaft is sequentially connected with one element of each of the first planetary gear set, the second planetary gear set, and the third planetary gear set. The first brake fixes an element of the second planetary gear set by fixing an element of the third planetary gear set directly connected with the element of the second planetary gear set or fixes the element of the third planetary gear set by fixing the element of the second planetary gear set directly connected with the element of the third planetary gear set. The clutch is provided to simultaneously engage and disengage an element of the second planetary gear set with/from the first motor generator and the second brake.

The first planetary gear set is a single-pinion type planetary gear set, including a first sun gear connected with the first motor generator, a first carrier connected with the engine, and a first ring gear connected with the output shaft. The second planetary gear set is a double-pinion type planetary gear set, including a second sun gear connected with the first motor generator and the second brake through the clutch, a second carrier connected with the output shaft through the first ring gear, and a second ring gear connected with the first brake through the third planetary gear set. The third planetary gear set is a single-pinion type planetary gear set, including a third sun gear connected with the second motor generator, a third carrier connected with the output shaft through the second planetary gear set and the first planetary gear set, and a third ring gear connected with the first brake.

The planetary gear sets are coaxially arranged in parallel in the order of the first planetary gear set, the second planetary gear set, and the third planetary gear set. The engine is connected with the first planetary gear set. The output shaft is connected with the third planetary gear set through the first planetary gear set and the second planetary gear set. The second motor generator is connected with the third planetary gear set. The first motor generator is connected with the second planetary gear set and the first planetary gear set from the third planetary gear set.

The first planetary gear set, in a lever analysis diagram, is arranged on a first straight line in the order of an element connected with the first motor generator, an element connected with the engine, and an element connected with the output shaft. The second planetary gear set is arranged on a second straight line, which crosses the first straight line at least one point, in the order of an element connected with the output shaft, an element directly connected with the third planetary gear set, and an element connected with the first motor generator and the second brake through the clutch. The third planetary gear set is arranged on the second straight line in the order of an element connected with the second motor generator, an element connected with the output shaft, and element directly connected with the second planetary gear set, in which as the clutch is engaged, the first straight line and the second straight line make a single straight line.

The elements of the planetary gear sets are arranged on the second straight line in the order of the element of the third planetary gear set connected with the second motor generator, the elements of the second planetary gear set and the third planetary gear set which are directly connected with each other and connected with the output shaft, the elements of the second planetary gear set and the third planetary gear set which are directly connected with each other and connected with the first brake, and the element of the second planetary gear set which is connected with the first motor generator and the second brake through the clutch.

On the single straight line made by the first straight line and the second straight line by engagement of the clutch, the element of the first planetary gear set connected with the engine is disposed between two pairs of the elements, which are directly connected with each other, of the second planetary gear set and the third, planetary gear set.

The power train of a hybrid vehicle according to the invention has a simple configuration, high power performance, and reduced weight and fuel consumption, while being easily equipped in the vehicle. In particular, a significant amount of fuel consumption can be reduced when a vehicle is traveling at a high speed for a long time.

It is understood that the twin "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

For better understanding of the nature and objects of the present invention, reference should be made to the following detailed description with the accompanying drawings, in which.

DETAILED DESCRIPTION

Embodiments of the invention are described hereafter in detail with reference to the accompanying drawings, but theses embodiments are just examples and can be achieved in various modifications by those skilled in the art. Therefore, the present invention is not limited to the embodiments.

Figure 1:
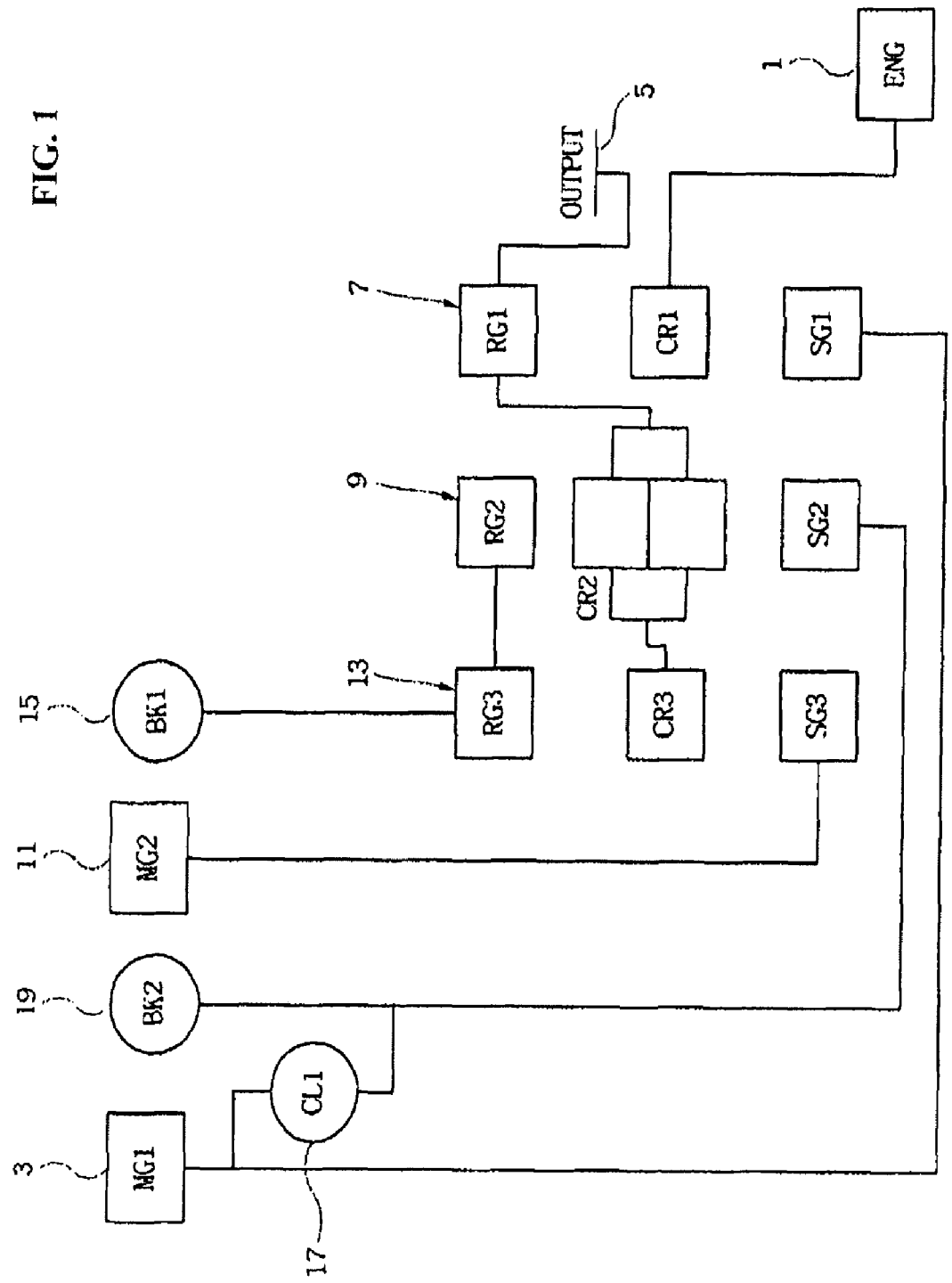
FIG. 1 is a view illustrating an example of the configuration of a power train of a hybrid vehicle according to the invention.

Referring to FIG. 1, a power train of a hybrid vehicle according to an embodiment of the invention includes: a first planetary gear set 7 including three elements where an engine 1, a first motor generator 3, and an output shaft 5 are separately connected; a second planetary gear set 9 including three elements which have one element directly connected with the element of first planetary gear set 7 connected with output shaft 5 and another element that can be intermittently connected with and disengaged from first motor generator 3; a third planetary gear set 13 including three elements, two elements of which are connected with second planetary gear set 9 and the other element of which is connected with a second motor generator 11; a first brake 15 that is provided to fix an element or elements of second planetary gear set 9 and third planetary gear set 13 which is or are connected with output shaft 5 through at least one of the three planetary gear sets and fix an element or elements of second planetary gear set 9 and third planetary gear set 13 other than an element or elements that can be connected at least intermittently with the first motor generator 3 or the second motor generator 11; a clutch 17 that can intermittently engage with first motor generator 3 an element of the second planetary gear set other than the element connected with the output shaft 5 and the element connected with the first brake 15; and a second brake 19 that is provided to fix the element of the second planetary gear set 9 connected with the clutch 17.

That is, the power train includes the three planetary gear sets 7, 9, 13, one clutch 17, and two brakes 15, 19 such that it can transmit/receive power to/from the two motor generators 3, 11, and receive power from the engine 1 and outputs shifted power through the output shaft 5.

The output shaft 5 is sequentially connected with one element of each of the first planetary gear set 7, the second planetary gear set 9, and the third planetary gear set 13.

Further, the first brake 15 can fix an element of the second planetary gear set 9 by fixing an element of the third planetary gear set 13 directly connected with the element of the second planetary gear set 9. Alternatively, the first brake 15 may fix an element of the third planetary gear set 13 by fixing an element of the second planetary gear set 9 directly connected with the element of the third planetary gear set 13.

The clutch 17 is provided to simultaneously engage or disengage an element of second planetary gear set 9 with/from the first motor generator 3 and the second brake 19.

The first planetary gear set 7 is a single-pinion type planetary gear set, in which a first sun gear is connected with the first motor generator 3, a first carrier is connected with the engine 1, and a first ring gear is connected with the output shaft 5.

The second planetary gear set 9 is a double-pinion type planetary gear set, in which a second sun gear is connected with the first motor generator 3 and the second brake 19 through the clutch 17, a second carrier is connected with the output shaft 5 through the first ring gear, and a second ring gear is connected with the first brake 15 through the third planetary gear set 13.

The third planetary gear set 13 is a single-pinion type planetary gear set, in which a third sun gear is connected with the second motor generator 11, a third carrier is connected with the output shaft 5 through the second planetary gear set 9 and the first planetary gear set 7, and a third ring gear is connected with the first brake 15.

In this embodiment, the planetary gear sets are coaxially arranged in parallel in the order of the first planetary gear set 7, the second planetary gear set 9, and the third planetary gear set 13. The engine 1 is connected with the first planetary gear set 7, the output shaft 5 is connected with the third planetary gear set 13 through the first planetary gear set 7 and the second planetary gear set 9, the second motor generator 11 is connected with the third planetary gear set 13, and the first motor generator 3 is connected with the second planetary gear set 9 and the first planetary gear set 7 from the third planetary gear set 13.

Figures 2A, 2B:
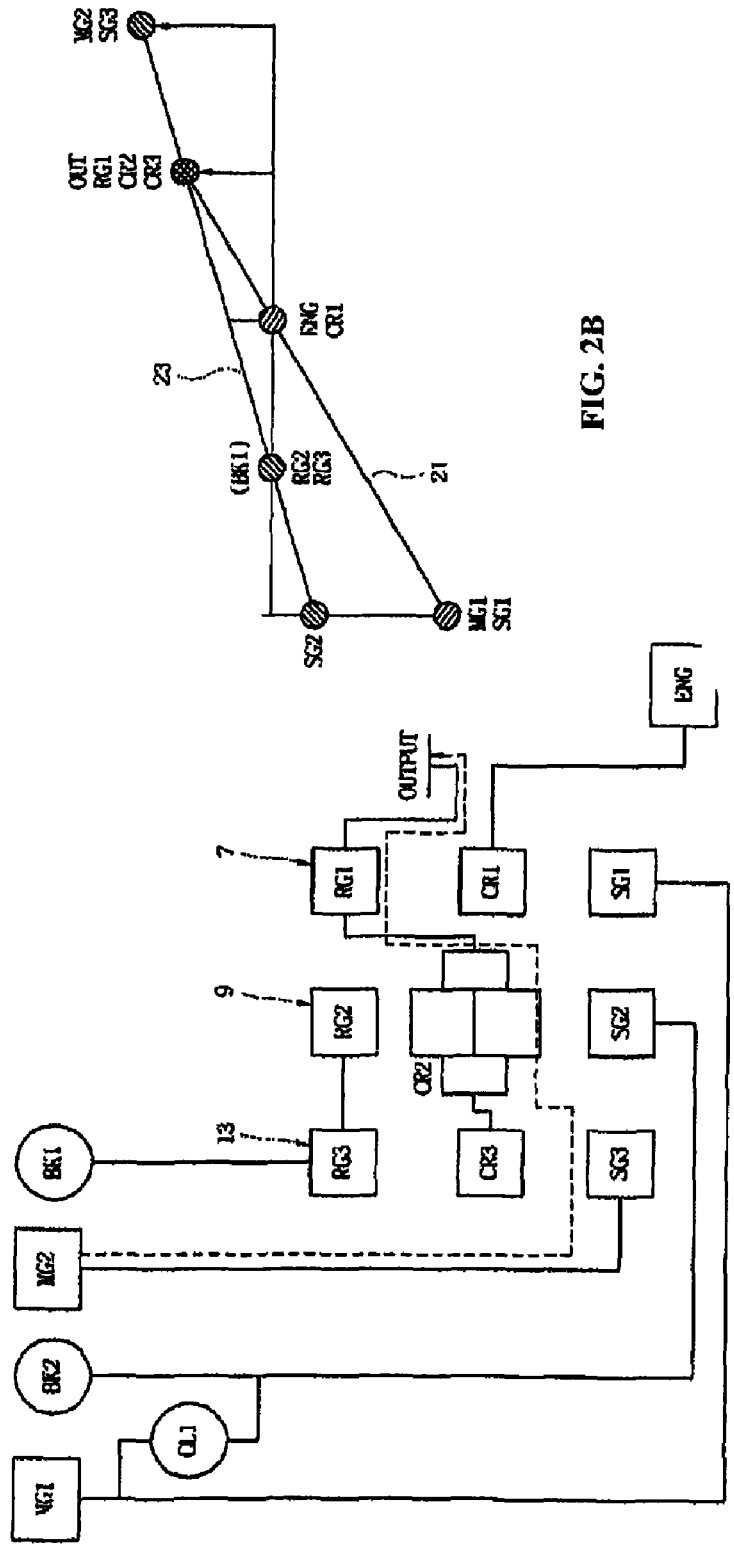
FIGS. 2A,B shows a power flow diagram and a lever analysis diagram illustrating that the power train of FIG. 1 achieves a first electric vehicle mode.

As shown in the lever analysis diagrams of FIGS. 2A,B to 7A,B, the first planetary gear set 7 is arranged on a first straight line 21 in the order of an element connected with the first motor generator 3, an element connected with the engine 1, and an element connected with the output shaft 5. The second planetary gear set 9 is arranged on a second straight line 23, which crosses the first straight line 21 at one or more points, in the order of an element connected with the output shaft 5, an element directly connected with the third planetary gear set 13, and an element connected with the first motor generator 3 and the second brake 19 through the clutch 17. The third planetary gear set 13 is arranged on the second straight line 23, in the order of an element connected with the second motor generator 11, an element connected with the output shaft 5, and element directly connected with the second planetary gear set 9, in which as the clutch 17 is engaged, the first straight line 21 and the second straight line 23 make a single straight line.

The elements of the planetary gear sets are arranged on the second straight line 23 in the order of the element of the third planetary gear set 13 connected with the second motor generator 11, the elements of the second planetary gear set 9 and the third planetary gear set 13 which are directly connected with each other and connected with the output shaft 5, the elements of the second planetary gear set 9 and the third planetary gear set 13 directly connected with each other and connected with the first brake 15, and the element of the second planetary gear set 9 which is connected with the first motor generator 3 and the second brake 19 through the clutch 17.

On the single straight line made by the first straight line 21 and the second straight line 23 by engagement of the clutch 17, the element of the first planetary gear set 7 connected with the engine 1 is disposed between two pairs of the elements, which are directly connected with each other, of the second planetary gear set 9 and the third planetary gear set 13.

That is, when the clutch 17 is not engaged, the first sun gear, the first carrier, and the first ring gear are sequentially arranged on the first straight line 21, and the second sun gear, the second ring gear and the third ring gear, the second carrier and the third carrier, and the third sun gear are sequentially arranged on the second straight line 23. Accordingly, an end of the first straight line 21 always crosses the second straight line 23 at the point where the first ring gear is connected with the output shaft 5 together with the second carrier and the third carrier.

When the clutch 17 is engaged, on the other hand, the first straight line 21 overlaps the second straight line 23 such that the second sun gear and the first sun gear make a point, resulting that the first carrier connected with the engine 1 on the first straight line 21 is positioned between the second ring gear and the second carrier on the second straight line 23.

Accordingly, while the clutch 17 is engaged, the elements of the planetary gear sets are arranged on the single straight line in the order of the first sun gear and the second sun gear, the second ring gear and the third ring gear, the first carrier, the first ring gear and the second carrier and the third carrier, and the third sun gear.

The operation in each mode of the power train of a hybrid vehicle according to an embodiment of the invention is described hereafter with reference to the lever analysis diagrams of FIGS. 2A,B to 7A,B, which shows arrangement of the elements of the planetary gear sets and relative gear ratios of the elements as well.

FIG. 2A,B illustrates a first electric vehicle mode in which the vehicle is driven by at least one motor generator without operating an engine.

In this mode, the first brake 15 is engaged such that the second ring gear and the third ring gear are fixed while the clutch 17 and the second brake 19 are disengaged.

As the second motor generator 11 supplies torque to the third sun gear of the third planetary gear set 13, because the third ring gear of the third planetary gear set 13 is fixed, the power supplied is reduced according to a shift ratio of the third planetary gear set 13 and outputted to the output shaft 5 through the second carrier and the first ring gear.

For illustration purposes, the rotational direction of the output shaft 5 is defined as a normal direction and the opposite direction is defined as an inverse direction hereafter.

The engine 1 is stopped and is connected with the first carrier of the first planetary gear set 7, the first ring gear is connected with the output shaft 5, and the first sun gear is connected with the first motor generator 3. Accordingly, the first motor generator 3 rotates in the inverse direction of the output shaft 5 without torque.

Figures 3A, 3B:
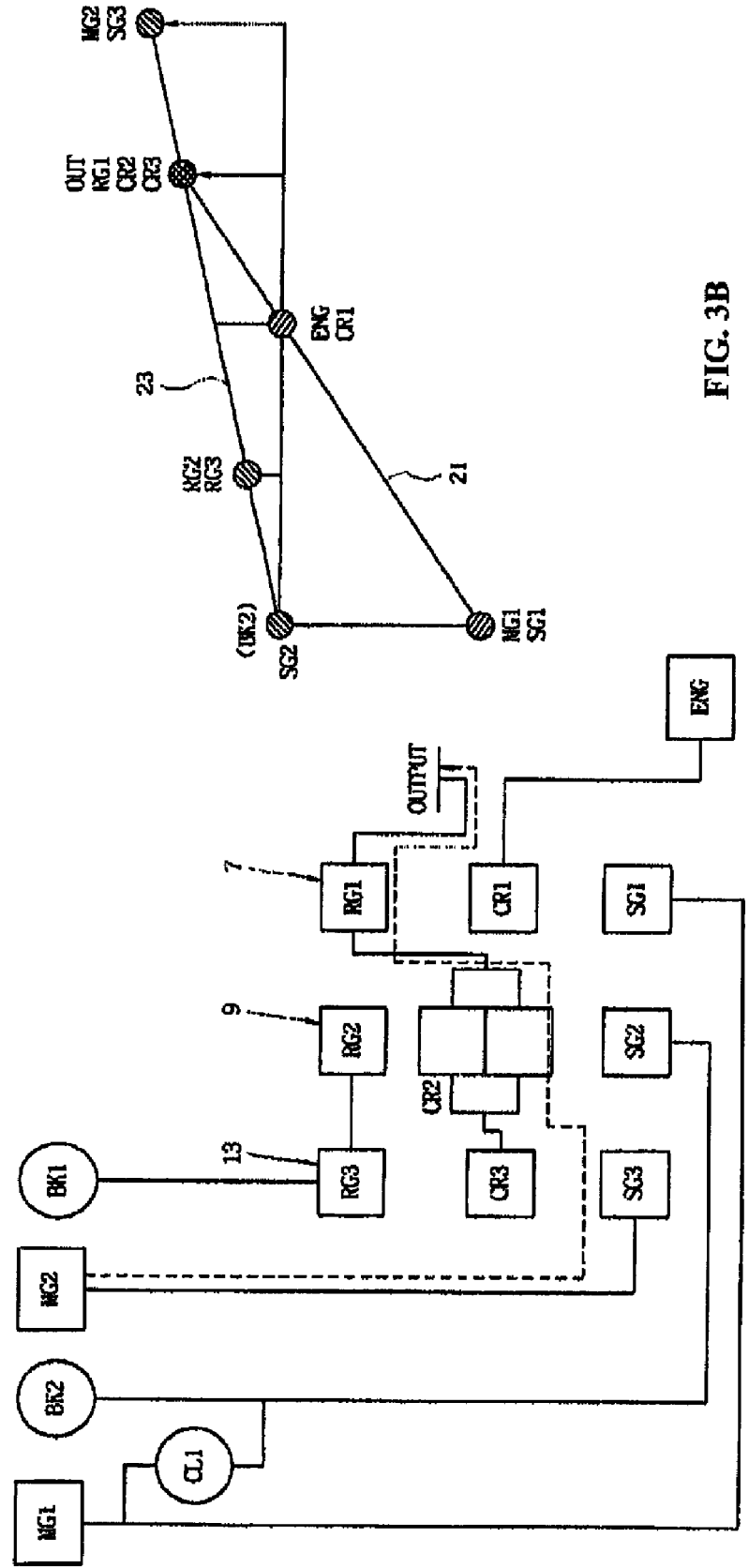
FIGS. 3A,B shows a power flow diagram and a lever analysis diagram illustrating that the power train of FIG. 1 achieves a second electric vehicle mode.

FIG. 3A,B illustrates a second electric vehicle mode different from the first electric vehicle mode.

In the second electric vehicle mode, the second brake 19 is engaged while the clutch 17 and the first brake 15 are disengaged.

As the second motor generator 11 generates torque, the torque is supplied to the third sun gear of the third planetary gear set 13 and the power supplied to the third sun gear is outputted to the output shaft 5 through the third carrier, the second carrier, and the first ring gear, in which the second sun gear is stopped by the second brake 19.

Since the engine 1 is stopped in the above operation, the first motor generator 3 connected with the first sun gear rotates in the inverse direction without torque.

As can be seen by comparing the lever analysis diagrams in FIGS. 2A,B and 3A,B, the shift ratio of the second electric vehicle mode is smaller than that of the first electric vehicle mode.

Figures 4A, 4B:
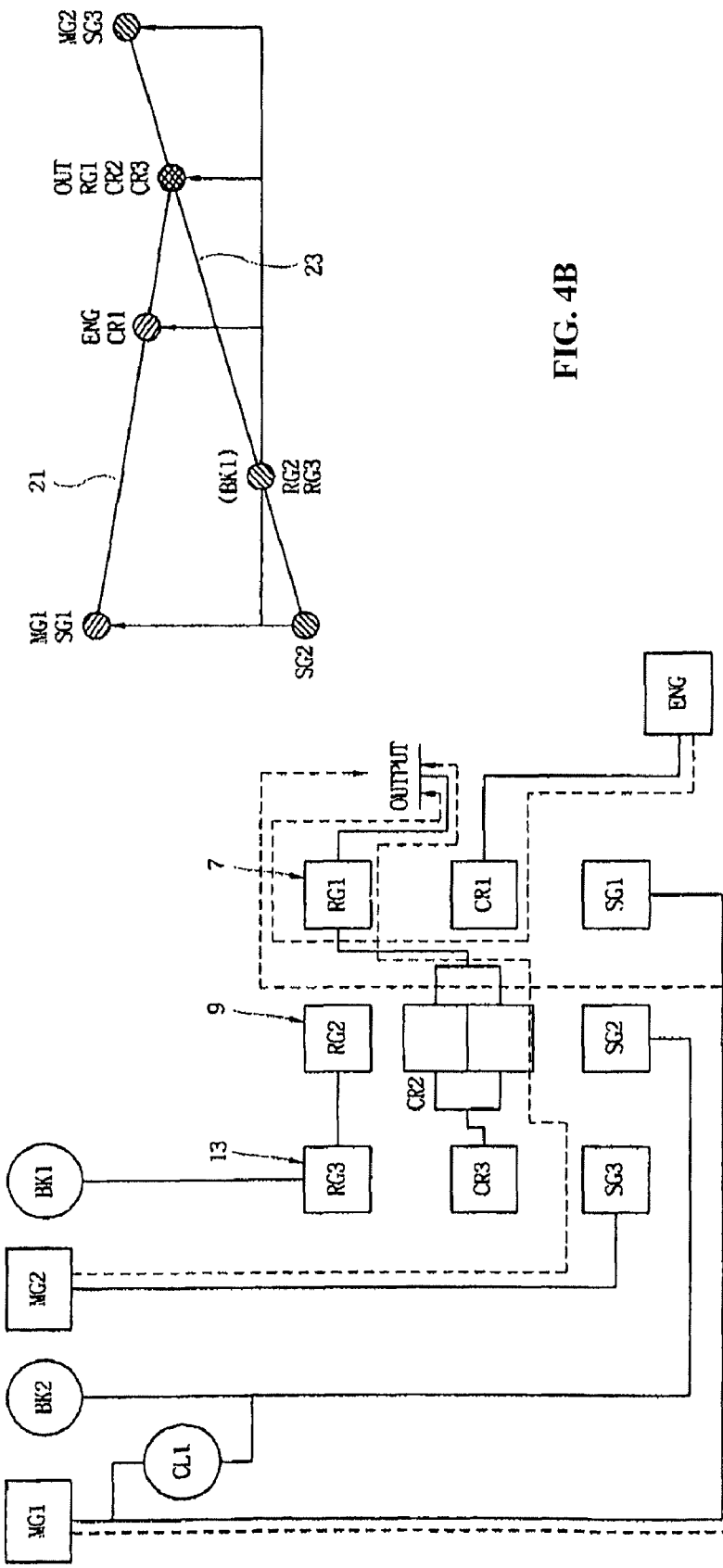
FIGS. 4A,B shows a power flow diagram and a lever analysis diagram illustrating that the power train of FIG. 1 achieves a first hybrid mode.

As the first motor generator 3 that has rotated in the inverse direction in the first electric vehicle mode is rotated in the normal direction as shown in FIG. 4A,B, the engine 1 increases in rotational velocity, can be started and generate torque, and thus power supplied from the second motor generator 11 and power supplied from the engine 1 are simultaneously outputted to the output shaft 5, thereby achieving a first hybrid mode.

In the first hybrid mode, the first brake 15 is engaged while second brake 19 and clutch 17 are disengaged.

In the above operation, the first motor generator 3 functions as a generator that provides a reaction force according to the torque of the engine 1, thereby substantially controlling the shift ratio.

The second motor generator 11 cannot control the shift ratio because the third ring gear is fixed by the first brake 15, such that it only functions as a motor that transmits torque to the output shaft 5 through the third carrier.

Figures 5A, 5B:
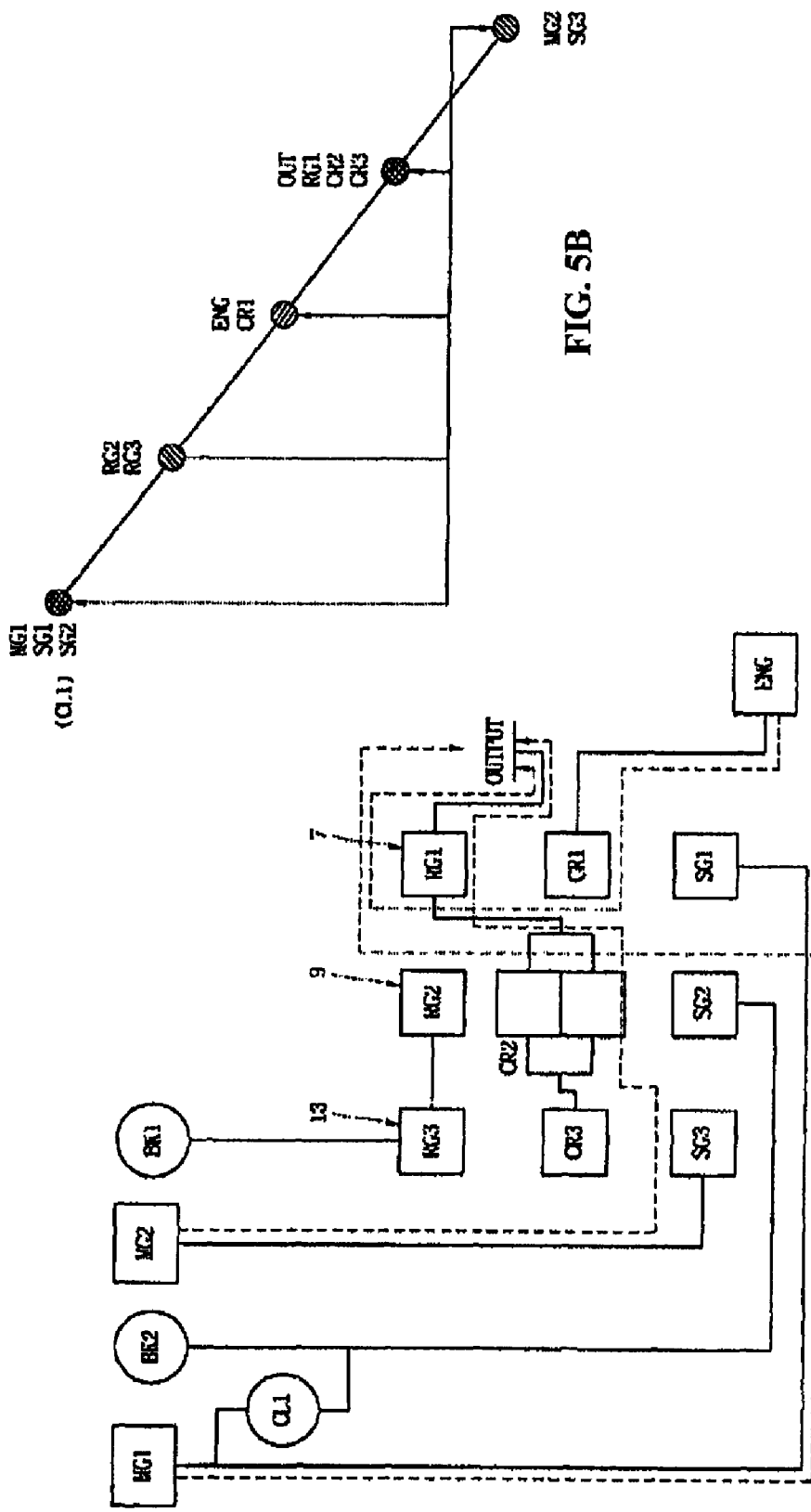
FIGS. 5A,B shows a power flow diagram and a lever analysis diagram illustrating that the power train of FIG. 1 achieves a second hybrid mode.

FIG. 5A,B illustrates a second hybrid mode that is different from the first hybrid mode, in which the first hybrid mode is changed to the second hybrid mode by engaging the clutch 17 and disengaging the first brake 15 after synchronizing the velocities of the first sun gear and the second sun gear by controlling the shift ratio in the first hybrid mode.

As the clutch 17 is engaged as described above, all of the first planetary gear set 7, the second planetary gear set 9, and the third planetary gear set 13 make a lever on a single straight line in the lever analysis diagram.

Here, the clutch 17 is engaged and the third planetary gear set 13 is also involved in control of the shift ratio, in which the first motor generator 3 functions as a generator and the second motor generator 11 functions as a motor, thereby achieving the second hybrid mode different from the first hybrid mode.

Figures 6A, 6B:
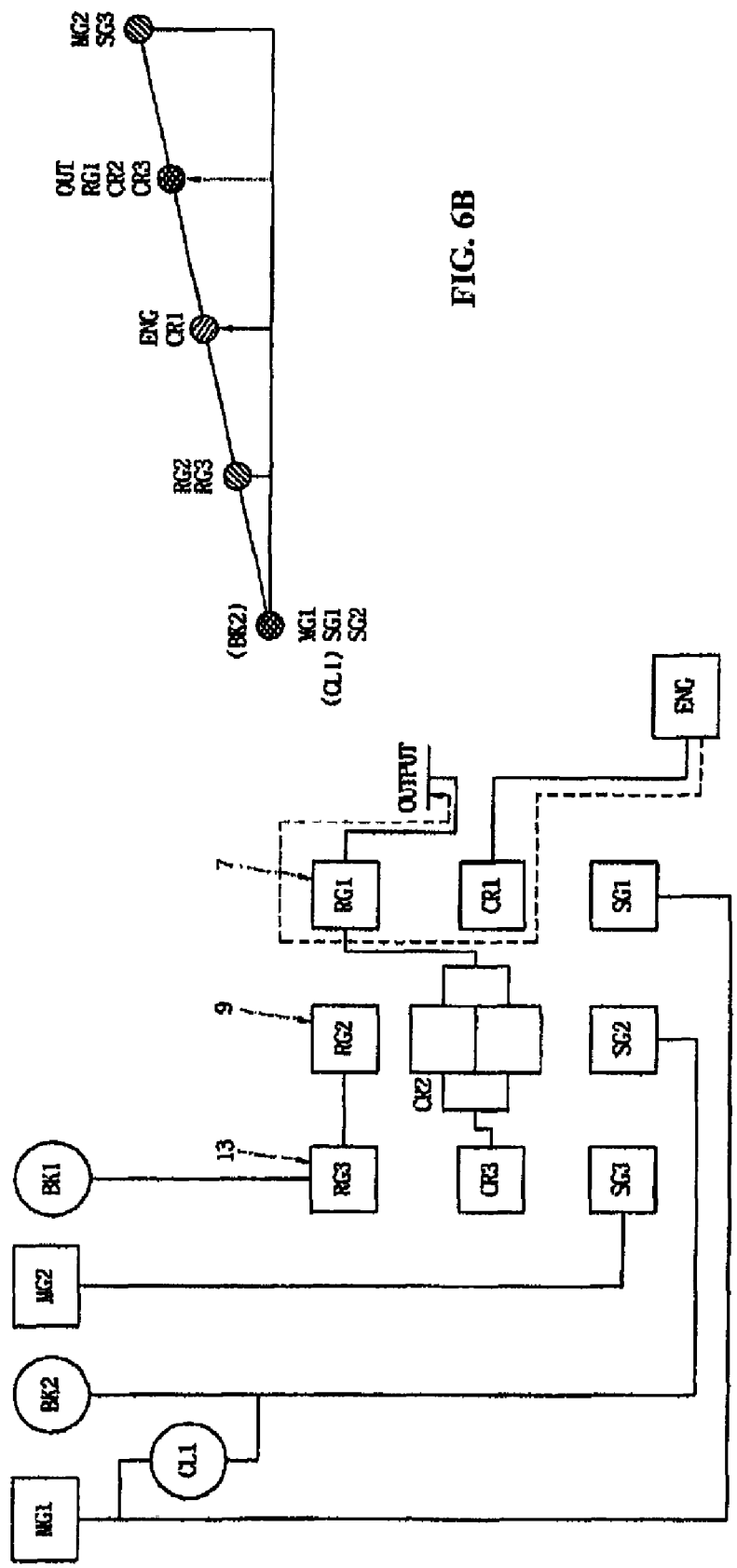
FIGS. 6A,B shows a power flow diagram and a lever analysis diagram illustrating that the power train of FIG. 1 achieves a first engine mode.

FIG. 6A,B shows a first engine mode that can be provided by the power train of the invention.

An overdrive shift ratio as shown in the figure is achieved by fixing the first sun gear and the second sun gear by engaging the second brake 19 after making velocities of the first sun gear and the second sun gear zero by controlling the shift ratio in the second hybrid mode with the clutch 17 engaged. The first engine mode, in which engine 1 takes mode torque, is achieved by removing the torque of the first motor generator 3 and the torque of the second motor generator 11.

Figures 7A, 7B:
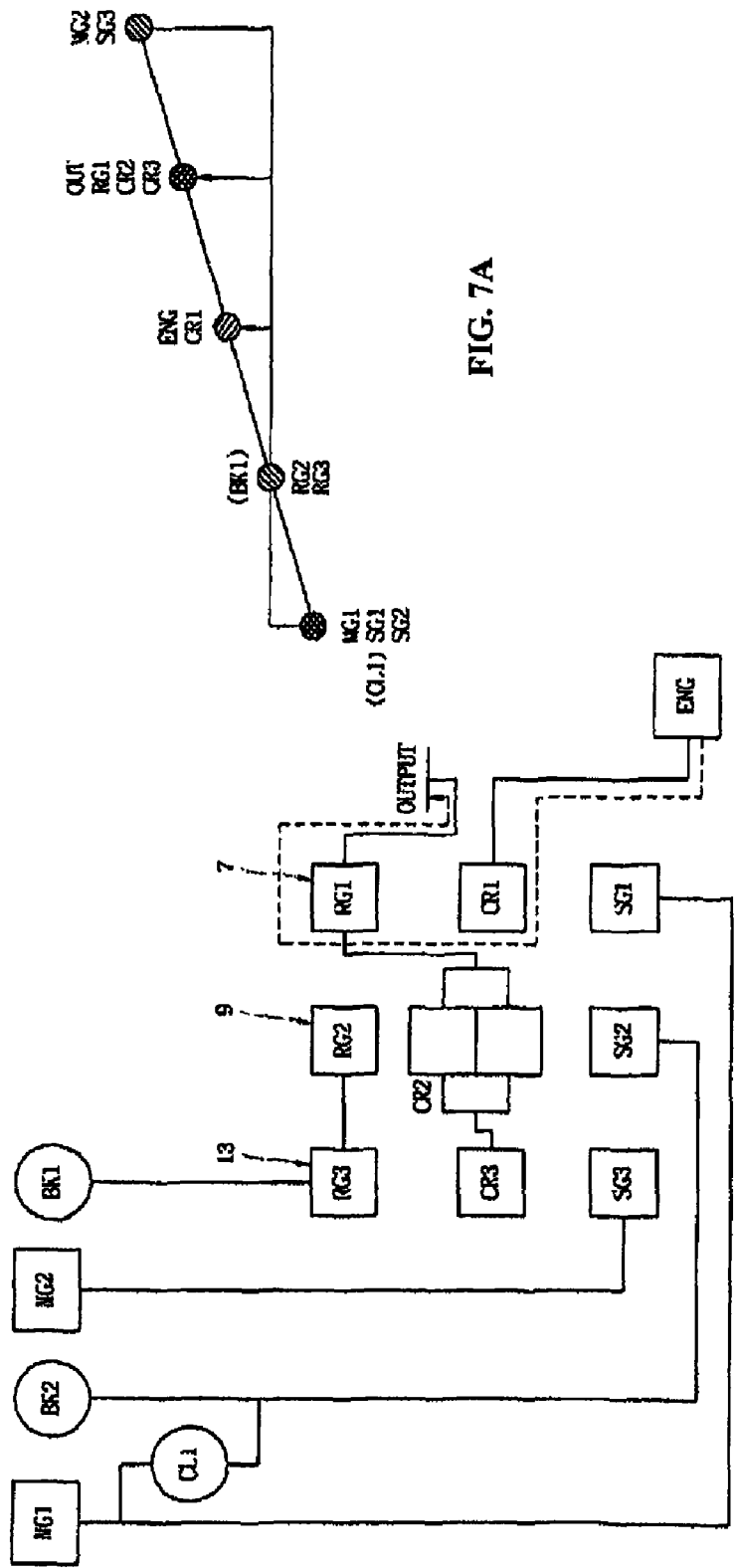
FIGS. 7A,B shows a power flow diagram and a lever analysis diagram illustrating that the power train of FIG. 1 achieves a second engine mode.

FIG. 7A,B shows a second engine mode that can be provided by the power train of the invention.

Another overdrive shift ratio as shown in the figure is achieved by fixing the second ring gear and the third ring gear using the first brake 15 after making velocities of the first ring gear and the third ring gear zero by controlling the shift ratio in the second hybrid mode with the clutch 17 engaged. The second engine mode, in which the engine 1 takes all needed torque, is achieved by removing the torque of the first motor generator 3 such that all of torque exerted in the third planetary gear set 13 are removed and then removing the torque of second motor generator 11.

Because the first engine mode and the second engine mode are both at the overdrive shift ratio state in which the engine 1 is smaller in the number of revolution than the output shaft 5, it is possible to reduce a significant amount of fuel consumption especially when a vehicle is traveling at a high speed for a long time.

In particular, the velocity of the output shaft 5 that increases with respect to the velocity of the engine 1 is larger in the second engine mode shown in FIG. 7A,B than that in the first engine mode shown in FIG. 6A,B, which makes it possible to further reduce the fuel consumption.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A power train of a hybrid vehicle, comprising:
   a first planetary gear set including a first carrier, a first sun gear and first ring gear wherein the first carrier is separately connected to an engine, the first sun gear is separately directly connected to a first motor generator, and the first ring gear is separately connected to an output shaft;
   a second planetary gear set including a second carrier, a second sun gear and a second ring gear, wherein the second carrier is directly connected with the first ring gear of the first planetary gear set, the second sun gear is connected to the first brake and is selectively connected to the first motor generator and the first sun gear through a clutch, and the second ring gear is directly connected with a third ring gear of a third planetary gear set;
   the third planetary gear set including a third carrier, and a third sun gear and the third ring gear, wherein the third carrier and third ring gear are connected to the second planetary gear set and the the third sun gear is directly connected with a second motor generator;
   a second brake directly connected to the third ring gear; and
   the clutch configured to engage and disengage the first motor generator with the second sun gear.

2. The power train of claim 1, wherein the output shaft is connected to the first ring gear directly, to the second carrier through the first ring gear, and to the third carrier through the second carrier and the first ring gear,
   wherein the second brake fixes the second ring gear via the third ring gear which is directly connected to the second ring gear, and
   wherein the clutch intermittently engages with the first motor generator to connect the second sun gear with the first motor generator.

3. The power train as defined in claim 2, wherein the first planetary gear set is a single-pinion type planetary gear set,
   the second planetary gear set is a double-pinion type planetary gear set, and
   the third planetary gear set is a single-pinion type planetary gear.

4. The power train of claim 3, wherein the planetary gear sets are coaxially arranged in parallel in the order of the first planetary gear set, the second planetary gear set, and the third planetary gear set,
   the engine is directly connected to only the first planetary gear set,
   the output shaft is connected with the third planetary gear set through the first planetary gear set and the second planetary gear set,
   the second motor generator is directly connected with only the third planetary gear set, and
   the first motor generator is connected with the third planetary gear set via the second planetary gear set.

5. A power train for a hybrid vehicle, comprising:
   a first planetary gear set including a first carrier, a first sun gear and a first ring gear wherein the first carrier is connected to an engine, the first sun gear is directly connected to a first motor generator, and the first ring gear is connected to an output shaft;
   a second planetary gear set including a second carrier, a second sun gear and a second ring gear, wherein the second carrier directly connected with the first ring gear of the first planetary gear set, the second sun gear is connected to a first brake and is selectively connected to the first motor generator and the first sun gear through a clutch, a the second ring gear is directly connected with a third ring gear of a third planetary gear set;
   the third planetary gear set including a third carrier, a third sun gear and the third ring gear, wherein the third carrier and third ring gear are connected to the second planetary gear set and the third sun gear is directly connected with a second motor generator;
   a second brake directly connected to the third ring gear of the third planetary gear set; and
   the clutch configured to engage with the first motor generator with the second sun gear of the second planetary gear set,
   wherein the output shaft is directly connected with just the first ring gear,
   wherein the second brake is engaged with the second ring gear through the third ring gear, wherein the third ring gear and the second ring gear are directly connected, and the second ring gear is connected with the output shaft through either the third planetary gear set or the second planetary gear set.

* * * * *